Jan. 23, 1962 R. E. BRUNSELL 3,017,867
APPARATUS FOR OPENING AND CLOSING MILKING BARN DOORS
Filed May 13, 1960 3 Sheets-Sheet 3
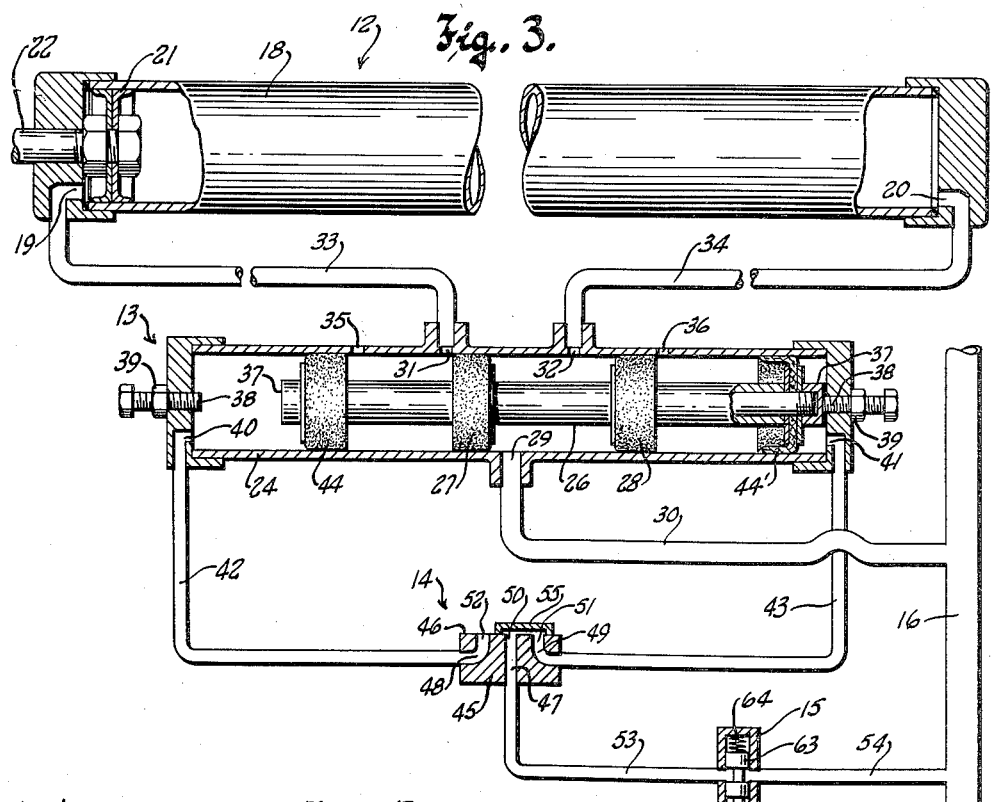
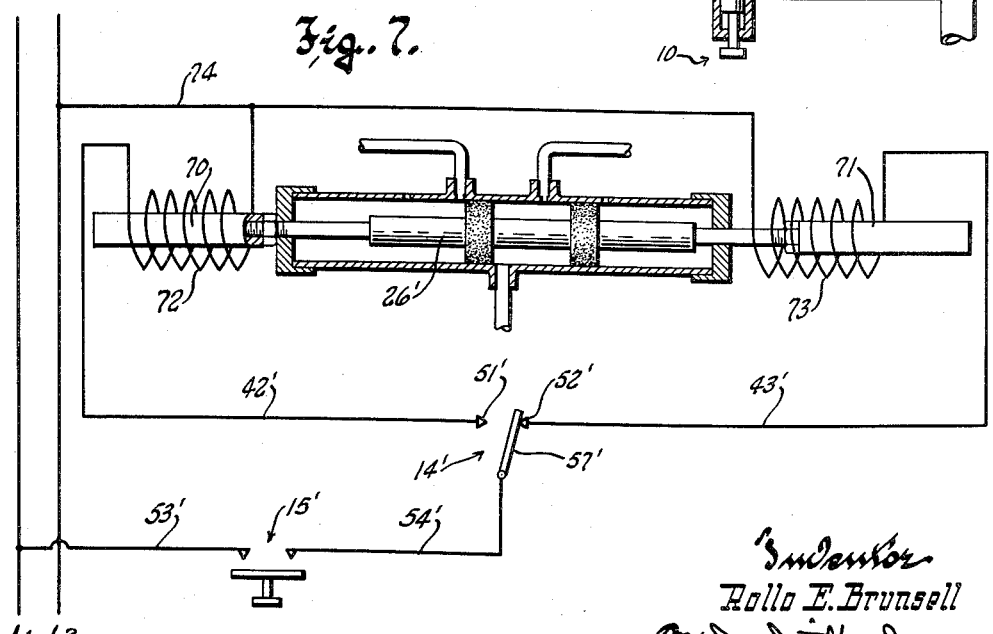
Inventor
Rollo E. Brunsell

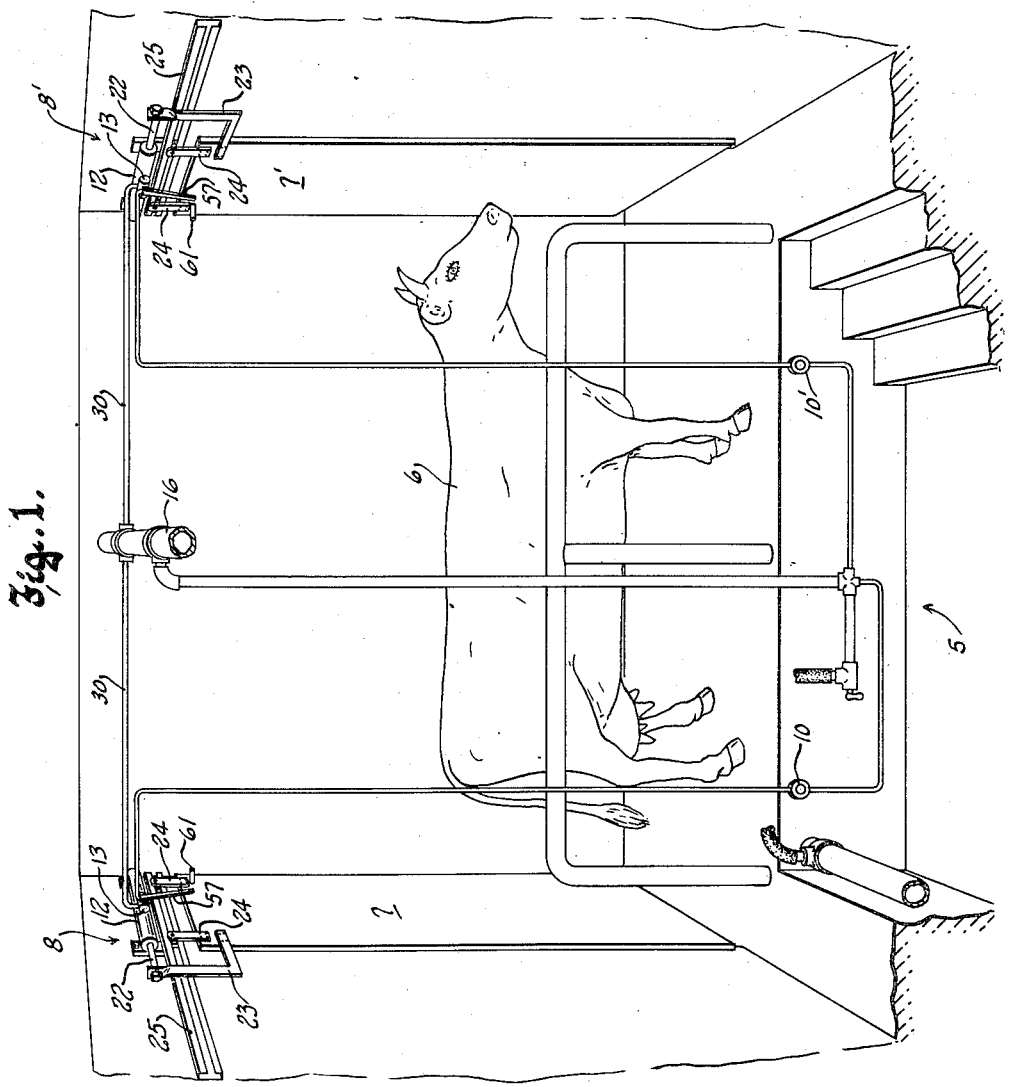

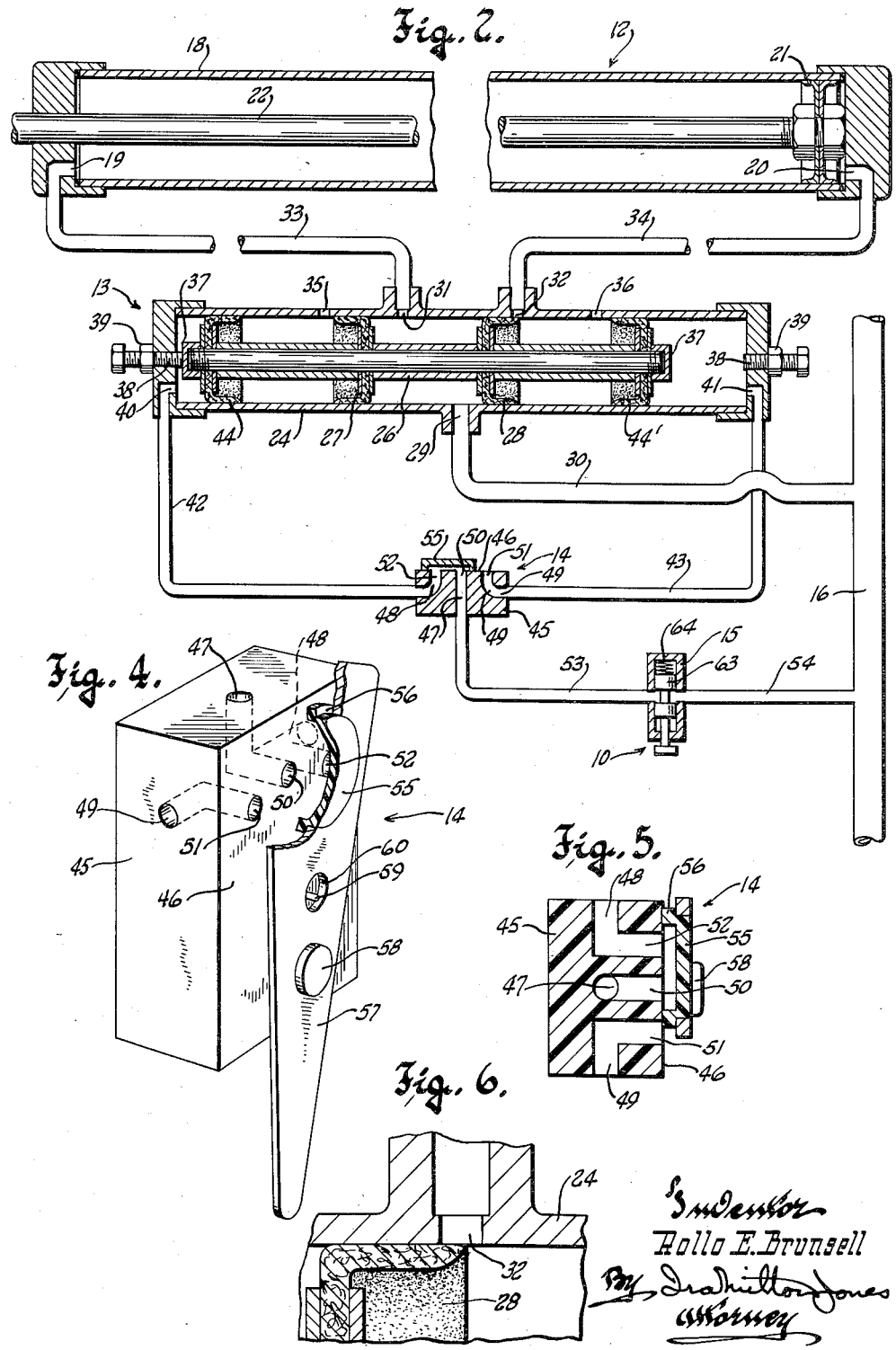

United States Patent Office 3,017,867
Patented Jan. 23, 1962

3,017,867
APPARATUS FOR OPENING AND CLOSING
MILKING BARN DOORS
Rollo E. Brunsell, Evansville, Wis.
Filed May 13, 1960, Ser. No. 29,070
3 Claims. (Cl. 121—44)

This invention relates to means for automatically actuating the entrance and exit doors of milking barns, and refers more particularly to a pushbutton controlled vacuum operated apparatus for automatically opening and closing the doors of milking stalls and the like.

Dairy farmers who use automatic milking machines have come to appreciate that the milking operation can be performed with great ease, efficiency and facility if automatically operated entrance and exit doors are provided for each milking stall. With such apparatus the entrance door to the milking stall can be rapidly opened to permit one cow to enter the stall, and then rapidly closed to keep other cows out of the stall until it is their turn to be milked. Similarly, after a cow is milked the exit door can be rapidly opened to expedite her departure from the stall and closed when she has left.

A major advantage of automatic door actuators is that they can be controlled from a station located at some distance from the door, conveniently accessible to the operator of the milking machine, and they thus save the operator a considerable amount of time and motion.

It is known that the same vacuum source that is provided for the milking machine can be efficiently utilized for door operation by applying such vacuum, through suitable control mechanism, to a vacuum jack which actuates each door. However, the devices which have heretofore been proposed for the vacuum operation of milking stall doors have had various objectionable characteristics, and it is the general object of the present invention to provide a control and actuating mechanism for the entrance and exit doors of milking stalls which is operated by vacuum, and which may thus be connected to the same vacuum pump that provides vacuum for the milking machine, but wherein the deficiencies of prior vacuum operated door actuators are avoided or overcome.

Thus it is a general object of this invention to provide a vacuum operated door opening and closing mechanism which may be readily controlled from one or more points in the dairy barn at or remote from the milking stall doors, and which provides for rapid opening and closing of the door or doors controlled thereby without creating substantial fluctuations in the pressure which obtains in the vacuum line.

In this connection it is a more specific object of this invention to provide vacuum operated door actuating means that includes a remotely controllable pilot valve which may be located closely adjacent to the vacuum jack by which a door is actuated, and which pilot valve operates on a very small volume of air and may be connected to the vacuum source by means of relatively small diameter vacuum lines, so that the operation of the pilot valve creates only negligible variations of pressure values in the vacuum system, and so that the larger diameter lines through which vacuum is applied to the jack, may be relatively short, to thus in all respects minimize vacuum fluctuations in the system.

Another specific object of this invention resides in the provision of vacuum operated door opening and closing apparatus of the character described wherein the door actuating vacuum jack is controlled by a pilot valve having simple means to provide for adjustment of the rate at which the jack moves the door both in opening and in closing it.

It is a further object of this invention to provide a vacuum operated door opening and closing mechanism of the character described wherein the actuation of the door or doors to be operated is controlled by one or more pushbuttons which may be situated at any location convenient to the operator, and which incorporates a selector which is responsive to the position of the door and which controls the direction in which the door is actuated, so that a single pushbutton can be used to either open a door which is closed or close a door which is open.

In this same connection, it is another object of this invention to provide a vacuum operated pushbutton controlled door opening and closing mechanism wherein the pushbutton which controls door actuation need only be pressed for a very brief instant to effect actuation of the door, so that an operator can devote his attention to other matters during most of the time that the door is moving.

It is also an object of this invention to provide a door actuating mechanism wherein a double acting vacuum jack actuator effects opening and closing of a door, and wherein the application of vacuum to the vacuum jack to control its direction and speed of motion is governed by control means which may be either vacuum operated or electrically operated, and which includes a pilot valve and a selector which positions the pilot valve in accordance with the position of the door.

A further object of this invention is to provide a simple and inexpensive pilot valve having a spool or spindle which is slidable back and forth in the valve body between a pair of defined positions, at each of which the pilot valve controls communication of a double acting vacuum jack with atmospheric air and a vacuum source in such a manner as to cause the piston of the jack to be moved in a selected direction, and which pilot valve has adjustable abutment means for so controlling the defined positions of its spindle that lands on the spindle partially block atmospheric air passages in the valve body to a predetermined extent and thereby regulate the rate at which air is admitted to the jack, to thus control the rate of motion of its piston.

Still another object of this invention resides in the provision of a very simple and inexpensive selector valve by which a vacuum source may be selectively connected with either of two points of vacuum application.

A further object of this invention resides in the provision of a vacuum operated actuating device for a door of a milking stall by which the door is held in either its open or its closed position by positive pressure at all times that vacuum is being developed and the door is not actually being moved, so that a cow attempting to enter the milking stall when the door is closed cannot open the door by pushing it with her nose.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a more or less diagrammatic perspective view of a milking stall having entrance and exit doors equipped with the door actuating and control apparatus of this invention;

FIGURE 2 is a more or less diagrammatic view of one form of the apparatus of this invention, at the beginning of a door opening operation, the control valve and vacuum jack being shown in longitudinal section;

FIGURE 3 is a view similar to FIGURE 2 but showing the mechanism at the beginning of a door closing operation;

FIGURE 4 is a perspective view of the selector valve of the apparatus of this invention, portions being broken away and shown in section;

FIGURE 5 is a horizontal sectional view through the selector valve of FIGURE 4;

FIGURE 6 is an enlarged fragmentary longitudinal sectional view of the control or pilot valve, showing the same in the position in which it is represented in FIGURE 2, and illustrating the manner in which the valve effects control of the flow into the vacuum jack of air at atmospheric pressure; and FIGURE 7 is a more or less diagrammatic view of a modified form of the control mechanism of this invention, adapted to be actuated electrically.

Referring now more particularly to the accompanying drawings, the numeral 5 designates generally a milking stall in a dairy barn in which a cow 6 may be milked by means of an automatic milking machine, not shown. The cow is permitted to enter the milking stall through an entry door 7 which is actuated by the apparatus of this invention, designated generally by 8, and is permitted to leave the milking stall through an exit door 7' which is actuated and controlled by another apparatus 8', which may be a duplicate of the apparatus 8.

When it is desired to admit a cow to the milking stall, a pushbutton 10, situated in any convenient location in the dairy barn, is pushed to cause the actuating and control apparatus 8 to open the entry door 7, as hereinafter described. As soon as a cow has entered the milking stall the button 10 is again pushed to effect closure of the entry door. At the conclusion of milking the operator presses another button 10', which may also be situated at any convenient location in the barn, and thereby effects opening of the exit door 7' by means of the apparatus 8', the exit door being closed by a second push of the button 10' after the cow has left the stall.

The apparatus by which each of the doors is controlled and actuated comprises, in general, a double acting vacuum jack 12, by means of which the door is moved in both its opening and its closing directions, a control or pilot valve 13, which controls the application of vacuum and air pressure to the vacuum jack and by means of which the rate of movement of the vacuum jack may be regulated, a selector valve 14 which governs the operation of the control valve, and a pushbutton operator 15 actuated by the pushbutton 10. The several elements just mentioned are all connected with a main vacuum duct 16 which in turn connects to a pump (not shown) or other vacuum source that comprises a part of the vacuum system for the milking machine (not shown).

Each of the doors 7 and 7' is mounted for sliding motion on a horizontal overhead track 25 secured to the fixed structure of the barn and which guidingly carries roller brackets 24 upon which the door is hung. The double acting vacuum jack 12 is preferably mounted on the fixed structure of the barn, directly above the opening closed by the door, and it comprises in general an elongated cylinder 18 having ports 19 and 20 in its end portions, a piston 21 snugly slidable in opposite directions in the cylinder, and a coaxial piston rod 22 connected to the piston and projecting from the cylinder through one end thereof. The door is connected with the piston rod 22 of the vacuum jack by means of a bracket 23 secured to the upper portion of the door near one edge thereof and to the outer projecting end portion of the piston rod 22.

With the door in its closed position and the piston of the vacuum jack in its retracted position shown in FIGURE 2, the application of vacuum to the port 19 of the cylinder and the admission of air under atmospheric pressure to the port 20 will cause a pressure differential across the piston by which it is moved to the left, extending the piston rod 22 out of the cylinder and actuating the door to its open position. The door may of course be closed by applying vacuum to the port 20 while admitting air under atmospheric pressure to the port 19.

Control of the application of vacuum and atmospheric air to the hydraulic jack is effected by means of the pilot valve 13, which is mounted closely adjacent to the vacuum jack on the fixed structure of the barn and which preferably comprises a spool valve having a cylindrical body 24 in which a spool or spindle 26 is axially slidable. Axially spaced apart lands 27 and 28 on the spindle 26 cooperate with ports in the side wall of the cylindrical pilot valve body to control the flow of air through the body and thus govern the operation of the vacuum jack. Specifically, the pilot valve body has a vacuum inlet port 29 intermediate its ends which is connected with a duct 30 that communicates with the main vacuum duct 16. Axially spaced to opposite sides of the vacuum inlet port 29 are outlet ports 31 and 32, which are respectively connected by means of ducts 33 and 34 with the ports 19 and 20 in the hydraulic jack cylinder body. And spaced axially outwardly from the outlet ports 31 and 32 are air inlet ports 35 and 36 which admit atmospheric air to the interior of the valve body.

In the condition shown in FIGURE 2, the land 27 on the spindle 26 is interposed between the air inlet 35 and the outlet port 31, while the land 28 is interposed between the vacuum inlet 29 and the outlet port 32; and consequently the vacuum inlet 29 is communicated with the outlet port 31 while the air inlet port 36 is communicated with the outlet port 32. Hence vacuum is applied to the left side of the vacuum jack piston 21, through the duct 33 and the port 19 in the jack cylinder 18, while air at atmospheric pressure is applied to the right side of the piston through the duct 34 and the port 20 in the jack cylinder, and the piston tends to move to the left.

When the spindle 26 of the pilot valve is moved to the right, to the position illustrated in FIGURE 3, its lands 27 and 28 provide for communication of the vacuum inlet port 29 with the outlet port 32 and of the air inlet port 35 with the outlet port 31, thus applying vacuum to the port 20 of the jack cylinder 18 and admitting atmospheric pressure air through the port 19, to cause the piston 21 to move to the right.

The operative positions of the pilot valve spindle 26, respectively shown in FIGURES 2 and 3, are defined by the engagement of abutments 37 on the ends of the spindle with the inner ends of screws 38 threaded through the end walls of the cylindrical valve body 24 and secured by lock nuts 39, and these screws provide for regulation of the speed of the jack in each of its directions of motion. To this end the screws 38 can be so adjusted that in each of the defined positions of the pilot valve spindle one of its lands 27 or 28 more or less blocks that one of the outlet ports 31 or 32 which is then communicated with an air inlet port 35 or 36. Specifically, when the left screw 38 is so adjusted as to stop the spindle in the left hand position shown in FIGURE 2, the land 28 partially blocks the flow of atmospheric air from the inlet port 36 into the outlet port 32, as best seen in FIGURE 6, causing the vacuum jack to open the door with a relatively slow motion. FIGURE 3 shows the right hand screw 38 adjusted to dispose the spindle in an operative position in which its land 27 leaves the outlet port completely uncovered, permitting maximum flow of atmospheric air thereto, and under these conditions the vacuum jack would have a relatively rapid door closing action. To provide for such partial blocking of the outlet ports, each of the lands has substantial thickness axially of the spindle, being preferably formed as a leather cup, as shown.

The pilot valve may be vacuum actuated to either of its operative positions, and for that purpose its body is provided with ports 40 and 41 at the ends thereof which are connected with the selector valve 14 by means of ducts 42 and 43, respectively, and thence, through the pushbutton operator 15, with the main vacuum line 16. It will be seen as the description proceeds that the spool 26 of the pilot valve functions, in effect, as the piston of a small vacuum jack, but because the spool has a relatively short stroke and does not have any load connected to it, the ducts 42 and 43 can be of very small diameter, and consequently the actuation of the pilot valve itself will cause only a negligible fluctuation in the values of pressure in the main vacuum line 16.

To provide for such vacuum actuation, the spool 26 is provided with lands 44 and 44' near its ends, which may be substantially identical with the lands 27 and 28 in that they have a snug but slidable fit in the bore of the cylindrical valve body, but which are spaced axially outwardly from the lands 27 and 28 by a sufficient distance so that the lands 44 and 44' never cross the air inlet ports 35 and 36 in the pilot valve body. Thus the spool 26 moves in response to the differences in pressure in the outer end portions of the cylindrical valve body, being actuated to the left when vacuum is applied at the port 40 and atmospheric pressure air is admitted to the port 41, and being moved to the right when the vacuum and atmospheric air connections to the ports 40 and 41 are reversed.

The direction of actuation of the pilot valve spindle 26, and hence of the vacuum jack, is automatically controlled by the selector valve 14, which is mounted adjacent to the door that it controls, on the fixed structure of the barn. Preferably the selector comprises a block-like body 45 having a flat front face 46 and having three passages 47, 48 and 49 therein which respectively terminate at ports 50, 51 and 52 at the face 46 of the body. The passage 47, which may be regarded as an inlet passage, is connected, through a duct 53, the pushbutton operator 15, and another duct 54, with the main vacuum duct 16. The outlet passages 48 and 49 in the body are respectively connected with the ports 40 and 41 through the ducts 42 and 43, and the ports 52 and 51 in which they respectively terminate are spaced substantially equal distances to opposite sides of the port 50 which constitutes the mouth of the inlet passage 47.

A cup-like member 55, having a circumferential radially outwardly projecting flange 56 around its rim which flatwise overlies the front face 46 of the selector body, provides for selective communication of the inlet passage port 50 with one or the other of the outlet passage ports 51 or 52. The diameter of the cup-like member is such that it can encompass the port 50 of the inlet passage 47 and one, but not both, of the ports 51 and 52 of the outlet passages 48 and 49. The cup-like member is slidingly held against the front face of the selector body by means of a flat arm 57 which is pivotally connected to the body member for edgewise swinging motion across the face 46, as by means of a pin 58 spaced to one side of the group of ports 50, 51 and 52. The cup-like member 55 is received in a snugly fitting aperture in the arm 57, with its flange 56 confined between the rear face of the arm and the flat front face 46 of the body member. The arm 57 also has another aperture 60, between the cup-like member and the trunnion, which cooperates with a peg 59 that projects forwardly therethrough from the flat face of the body member 45 to define the operative positions of the arm, at one of which the inlet passage 47 is connected with outlet passage 48 by the cup-like member 55 and at the other of which the inlet passage is connected with outlet passage 49. It will be observed that the flange 56 of the cup-like member is held in good sealing engagement with the flat front face of the selector body by reason of the fact that vacuum is applied to the interior of the cup-like member.

To effect motion of the arm 57 from one of its positions to the other, the arm has a lost motion connection with the door, which may consist merely of a resiliently flexible peg-like abutment or projection 61 on the door that strikes the arm 57 each time it moves past the selector as the door is opened or closed, shifting the position of the arm, and which then flexes to clear the arm as the door continues to move past the selector.

The pushbutton operator 15, which is connected with the inlet passage 47 of the selector valve by means of the duct 53 and with the main vacuum duct 16 by means of the duct 54, comprises a valve 63 which is normally biased to its closed position by means of a spring 64 and which may be manually moved to its open position by means of the pushbutton 10. When the pushbutton valve is open, vacuum from the main vacuum duct 16 is applied to the inlet passage 47 in the selector valve body and thence to one of the ports 40 or 41 of the pilot valve, as determined by the position of the selector. Obviously two or more pushbutton operators, situated at different locations and connected in parallel with one another, could be provided for the control of each door.

In the situation illustrated in FIGURE 2, in which the door is closed and is about to be opened in consequence of opening of the pushbutton valve, the ports 50 and 52 in the selector valve body are communicated through the cup-shaped member 55 of the selector and therefore vacuum is applied to the port 40 of the pilot valve. Since the port 51 of the selector is open to atmospheric air, such air will be admitted to the port 41 in the pilot valve, through the duct 43, and the spool 26 will be propelled to the position shown in FIGURE 2. The pushbutton may be released immediately after the pilot valve spool has been thus actuated since the pilot valve thereafter directs the flow of vacuum and atmospheric air to the jack cylinder in the proper directions to effect door opening. So long as the pushbutton valve 15 remains closed, the opening actuation of the door continues, even though the selector valve is moved to its position shown in FIGURE 3 during the course of door opening motion, due to the engagement of the lost motion connection abutment 61 against the arm 57. However, when the pushbutton valve 15 is next opened, the pilot valve spindle 26 is actuated to its door closing position (spindle moved to the right), in which it applies vacuum and atmospheric air to the jack in such a manner as to effect door closing retraction of the piston rod 22, all as illustrated in FIGURE 3.

Attention is directed to the fact that vacuum continues to be applied to the jack, through the pilot valve, even after the jack piston 22 has reached one of its limits of travel, thus holding the door in the position to which it has been actuated.

The embodiment of the invention illustrated in FIGURE 7 provides for electrical operation of the pilot valve, rather than vacuum operation, and thus further reduces the possibility of fluctuations of pressure in the main vacuum duct due to operation of the apparatus. In this version of the invention the ends of the spindle 26' of the pilot valve comprise plungers 70 and 71 which project outside the ends of the valve body and cooperate with solenoids 72 and 73 which may be fixed on the valve body. One side of each solenoid is connected, through a conductor 74 with one side $L_2$ of an electric current source $L_1$—$L_2$. Each solenoid has its other side connected, by means of a conductor 42' and 43', to one of the terminals 51' and 52' of a double-throw switch 14', which corresponds in operation to the selector valve 14 in the vacuum operated version of the device described above. The switch arm 57' of the switch 14', which is adapted to selectively engage either the terminal 51' or the terminal 52', is connected with the main $L_1$ through a conductor 54', a normally open pushbutton switch 15', and a conductor 53'. The selector switch arm 57', of course, has a lost motion connection with the door to be actuated, which may be similar to that provided for the arm 57 of the selector valve 14 in the vacuum operated control apparatus.

When the pushbutton switch 15' is manually closed, it effects energization of whichever of the solenoids 72 or 73 is then connected with the "live" terminal 51' or 52' of selector switch 14', attracting the plunger which cooperates with that solenoid and moving the spindle 26' in the corresponding direction.

The spindle 26' of course cooperates with ports in the pilot valve body to effect controlled actuation of a vacuum jack in the same manner as the vacuum actuated pilot valve spindle 26 described above. The solenoid plungers 70 and 71 may be adjustably threaded onto smaller diameter shaft portions 76 on the valve spindle, which project through the valve body end walls 77, so that the axially inner ends 78 of the plungers can cooperate with the body end walls in providing adjustable stops which define the operative positions of the pilot valve.

From the foregoing description, taken together with the accompanying drawings, it will be apparent that this invention provides a vacuum operated door closing mechanism for milking stalls and the like which provides for rapid and positive automatic opening and closing of a door upon momentary actuation of a pushbutton control situated at any convenient location, and which positively holds the door in the position to which it has been actuated so long as there is vacuum in the system. It will also be apparent that the apparatus of this invention can be operated from the same vacuum source utilized for a milking machine without causing undesirable fluctuations of vacuum in the system, and that operation of the mechanism is extremely simple by reason of the fact that the mechaism includes a selector which automatically provides for movement of the door in the required direction, so that a single pushbutton control provides for both opening the door when it is closed and closing it when it is open.

What is claimed as my invention is:

1. Means for automatically moving a door, at the will of an operator, first in one direction and then in the other, said means comprising: a double acting vacuum jack comprising a cylinder adapted to be secured to a fixed structure and a piston movable in opposite directions in the cylinder and having a piston rod projecting from one end of the cylinder and adapted to be connected to a door to be operated, said cylinder having port means opening to its opposite ends; a pilot valve comprising a body having a pair of outlet ports, a pair of air inlet ports opening to the air, and a vacuum inlet port connectable with a vacuum source, and a valve member movable in the body in opposite directions to a pair of defined positions, at each of which said valve member defines two port connecting passages through the valve body, said valve member in one of its positions providing for communication of one air inlet port with one outlet port and the vacuum inlet port with the other outlet port, and in the other of its positions providing for communication of said other outlet port with the air inlet port and the vacuum port with said first designated outlet port; duct means connecting each of the outlet ports in the pilot valve body with one of the port means on the cylinder of the vacuum jack; a pair of power means on the pilot valve body each cooperable with the valve member to move the same to each of its defined positions; selector means connected with said power means on the pilot valve body and including an element movable to either of two positions at each of which the selector means provides for energization of one of said power means to propel the valve element of the pilot valve to one of its said positions; cooperating means movable with the piston of the vacuum jack and on the movable element of the selector means providing a lost motion connection between them whereby movement of the piston in each direction moves the movable element of the selector means from one to the other of its positions; a manual control member; and means connecting the manual control member between a source of energizing medium and the selector means for controlling the application of power to said power means on the pilot valve in order to propel the valve element of the pilot valve in the direction determined by the position of the movable element of the selector means.

2. A vacuum selector valve for applying vacuum from a source thereof to either of two points of application, said valve comprising: a valve body having a flat face and having three passages therein, each communicated with a port that opens to said flat face, one of said ports being spaced substantially equidistant from the other two and having its communicated passage connectable to a vacuum source, and the passages communicated with the other two ports being connectable with points of vacuum application; a substantially cup-shaped member having a radially outwardly projecting flange around its rim which is slidable on said flat face of the valve body, said cup-shaped member having a diameter sufficiently large to cover said one port and one of the other two ports, and thus provide a continuous passage between the covered ports, while leaving the other of said two ports open; and an arm pivotally connected to said body for swinging motion back and forth across said flat face thereof, said arm having an aperture spaced from its pivotal connection to the body in which said cup-shaped member is snugly seated with its flange confined between the arm and the flat face of the body, so that swinging motion of the arm between a pair of defined positions carries the cup-shaped member into passage defining relation with said one port and one of said two ports in one defined position of the arm, and with said one port and the other of said two ports in the other defined position of the arm.

3. A pilot valve for controlling both the direction and the speed of operation of a double acting vacuum jack having a cylindrical body with ports opening to its ends and a piston axially slidable in the body in response to differences in air pressure in the end portions of the body, said pilot valve comprising: a substantially cylindrical valve body having a vacuum inlet port in its cylindrical wall, intermediate its ends, connectable with a vacuum source, a pair of outlet ports in its cylindrical wall axially spaced to opposite sides of the vacuum inlet port and connectable with the ports in the body of a double acting vacuum jack, and a pair of air inlet ports each located axially outwardly of one of the outlet ports; a spool in said valve body slidable in opposite directions between a pair of defined operative positions and having a pair of axially spaced apart lands thereon which closely fit the valve body and which are so located with respect to the ports in the valve body that in one operative position the spool provides for communication of one of the outlet ports with the vacuum inlet port and the other outlet port with its adjacent air inlet port, while in its other operative position the spool provides for communication of said other outlet port with the vacuum inlet port and the first mentioned outlet port with the other air inlet port; each of said lands on the spool being adapted to partially block an outlet port when the spool is in an operative position to thereby regulate the rate at which air flows through said outlet port from the then-connected air inlet port; and cooperating abutment means on the end portions of the spool and on the end portions of the valve body, axially adjustable to define the operative positions of the spool and to thereby regulate the extent to which the outlet ports are blocked by the lands in each operative position of the spool.

References Cited in the file of this patent

UNITED STATES PATENTS

| | | |
|---|---|---|
| 1,790,168 | Paul | Jan. 27, 1931 |
| 1,919,443 | McCune | July 25, 1933 |
| 1,952,690 | Strom | Mar. 27, 1934 |
| 2,304,245 | Dorries | Dec. 8, 1942 |
| 2,429,007 | Wilske et al. | Oct. 14, 1947 |
| 2,432,305 | Geiger | Dec. 9, 1947 |
| 2,688,314 | Holm et al. | Sept. 7, 1954 |
| 2,769,298 | Jones | Nov. 6, 1956 |
| 2,841,168 | Levetus et al. | July 1, 1958 |